United States Patent
Panje et al.

(10) Patent No.: US 11,617,004 B2
(45) Date of Patent: Mar. 28, 2023

(54) RESOLVING TUNER CONFLICTS AT DIGITAL VIDEO RECORDER

(71) Applicant: ARRIS Enterprises LLC, Suwanee, GA (US)

(72) Inventors: Krishna Prasad Panje, Bangalore (IN); Murali S. Sahasranaman, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/647,228

(22) Filed: Jul. 11, 2017

(65) Prior Publication Data

US 2019/0020917 A1    Jan. 17, 2019

(51) Int. Cl.
| | | |
|---|---|---|
| H04N 21/458 | (2011.01) | |
| H04N 21/433 | (2011.01) | |
| H04N 21/4147 | (2011.01) | |
| H04N 21/63 | (2011.01) | |
| H04N 21/462 | (2011.01) | |
| H04N 21/472 | (2011.01) | |

(52) U.S. Cl.
CPC ..... *H04N 21/4334* (2013.01); *H04N 21/4147* (2013.01); *H04N 21/4583* (2013.01); *H04N 21/462* (2013.01); *H04N 21/47214* (2013.01); *H04N 21/632* (2013.01)

(58) Field of Classification Search
CPC ........... H04N 21/4334; H04N 21/4147; H04N 21/4583; H04N 21/45; H04N 21/23113; H04N 21/4335
See application file for complete search history.

(56) References Cited

U.S. PATENT DOCUMENTS

| | | | | |
|---|---|---|---|---|
| 8,818,178 B1 * | 8/2014 | Bhogal | ............... | H04N 21/4583 386/292 |
| 2002/0025777 A1 * | 2/2002 | Kawamata | ......... | H04N 21/6143 455/3.06 |
| 2007/0009235 A1 * | 1/2007 | Walters | ............... | H04N 21/6581 386/278 |
| 2007/0071399 A1 * | 3/2007 | Ellis | ........................ | H04N 5/782 386/293 |
| 2007/0174336 A1 * | 7/2007 | Day | .................... | H04N 21/8545 348/E7.071 |

(Continued)

*Primary Examiner* — Pinkal R Chokshi
(74) *Attorney, Agent, or Firm* — Panitch Schwarze Belisario & Nadel LLC

(57) ABSTRACT

Methods, systems, and computer readable media may be operable to facilitate the resolving of a tuner conflict at a digital video recorder. When a multimedia device receives a request for a new recording session, and there is no available tuner for carrying out the recording session, the multimedia device may determine a duration of time until a tuner becomes available. If the duration of time until a tuner becomes available is less than a threshold duration, the multimedia device may initiate the recording session once the tuner becomes available, and the missing portion of the recording may be recovered at an alternate time or from an alternate content source. When the missing portion is recovered, the recording and the missing portion may be stitched together. If the duration of time until a tuner becomes available is greater than a threshold, the multimedia device may present alternate times for recording the requested content.

8 Claims, 4 Drawing Sheets

(56) References Cited

U.S. PATENT DOCUMENTS

| | | | |
|---|---|---|---|
| 2008/0060038 A1* | 3/2008 | Stallings | H04N 21/4788 |
| | | | 348/E7.071 |
| 2008/0091718 A1 | 4/2008 | Barsness et al. | |
| 2008/0276284 A1* | 11/2008 | Bumgardner | H04N 5/782 |
| | | | 725/58 |
| 2009/0142042 A1 | 6/2009 | Branam | |
| 2011/0055867 A1* | 3/2011 | Lee | H04N 21/4722 |
| | | | 725/40 |
| 2011/0225617 A1 | 9/2011 | Rakib | |
| 2012/0106932 A1* | 5/2012 | Grevers, Jr. | H04N 5/91 |
| | | | 386/292 |
| 2012/0213496 A1* | 8/2012 | Rothschild | H04N 21/2402 |
| | | | 386/326 |
| 2013/0275611 A1* | 10/2013 | Somekh | H04N 21/251 |
| | | | 709/231 |
| 2014/0181868 A1* | 6/2014 | O'Callaghan | H04N 21/4821 |
| | | | 725/39 |
| 2014/0237520 A1* | 8/2014 | Rothschild | H04N 21/4334 |
| | | | 725/88 |
| 2016/0249105 A1* | 8/2016 | Carney Landow | |
| | | | H04N 21/2393 |
| 2017/0374312 A1* | 12/2017 | Chen | H04N 7/165 |
| 2020/0092601 A1* | 3/2020 | Bhattacharjee | H04N 21/47214 |

* cited by examiner

RESOLVING TUNER CONFLICTS AT DIGITAL VIDEO RECORDER

TECHNICAL FIELD

This disclosure relates to resolving tuner conflicts at a digital video recorder.

BACKGROUND

With the advent of multi tuner gateway DVR (digital video recorder) boxes and remote DVR scheduling, the scheduling of content recordings has become streamlined. Cloud and network based record scheduling also eases the scheduling burden and resource conflict resolution. However, challenges still exist for handling record requests from the user of a multi-tuner gateway DVR in user premises. Such challenges are often seen during prime time recordings as well as during peak hours when new competing programs share the same time slot. The users of the gateway set top may not be aware if or when a tuner is free for recording. In some instances, certain live events/programs do not finish on schedule, and this may lead to premature termination of an associated recording. In certain cases, the gateway set top may be in the process of finishing a recording on a tuner (e.g., almost finished but resource not released to system), but the tuner remains locked because the program is not finished per guide or the software is still holding to the tuner resource to finish some book-keeping task. The user can save a recording from premature closure by allowing it to continue until the end. However, this will lead to the user missing out on initial portions of a new record request, until the tuner is made available to record the new request. Therefore, a need exists for methods and systems operable to facilitate an efficient and user-friendly tuner conflict resolution.

BRIEF DESCRIPTION OF THE DRAWINGS

Like reference numbers and designations in the various drawings indicate like elements.

DETAILED DESCRIPTION

It is desirable to provide methods and systems operable to facilitate an efficient and user-friendly tuner conflict resolution. Methods, systems, and computer readable media may be operable to facilitate the resolving of a tuner conflict at a digital video recorder. When a multimedia device receives a request for a new recording session, and there is no available tuner for carrying out the recording session, the multimedia device may determine a duration of time until a tuner becomes available. If the duration of time until a tuner becomes available is less than a threshold duration, the multimedia device may initiate the recording session once the tuner becomes available, and the missing portion of the recording may be recovered at an alternate time or from an alternate content source. When the missing portion is recovered, the recording and the missing portion may be stitched together. If the duration of time until a tuner becomes available is greater than a threshold, the multimedia device may present alternate times for recording the requested content.

It should be understood that the methods, systems, and computer readable media described herein may work equally well with either in-home DVR or with network-based DVR (e.g., nDVR). Network DVR (nDVR) storage has the benefit of keeping these archived video segments in the cloud. In-home DVR may be supplemented with nDVR, thereby allowing these archived video segments to be moved to cloud storage. This enables permanent storage, even if the in-home DVR is replaced.

Figure 1:
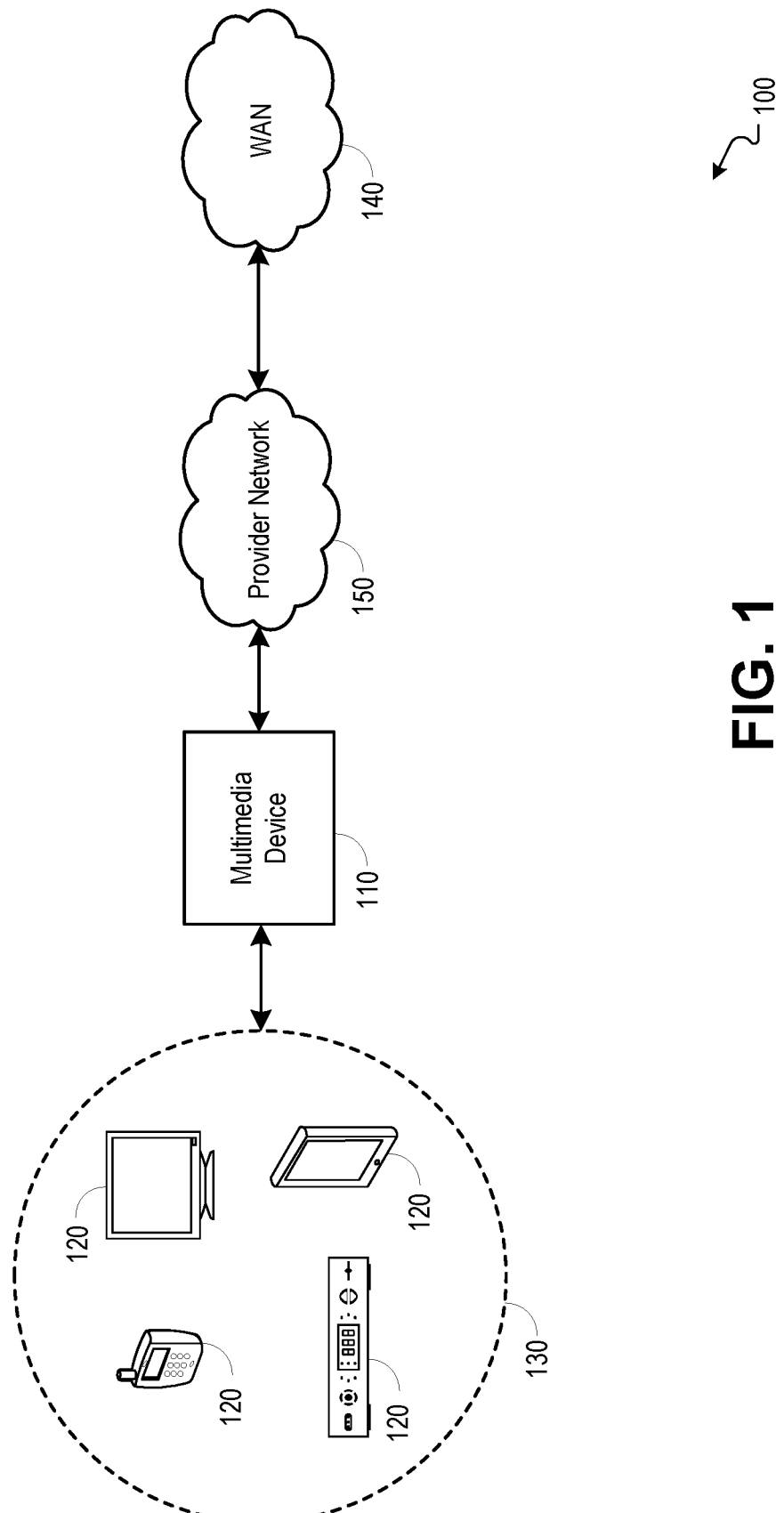
FIG. 1 is a block diagram illustrating an example network environment operable to facilitate the resolving of a tuner conflict at a digital video recorder.

FIG. 1 is a block diagram illustrating an example network environment 100 operable to facilitate the resolving of a tuner conflict at a digital video recorder. In embodiments, a multimedia device 110 may be configured to provide multimedia services to one or more client devices 120. The multimedia device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network 130 (e.g., a local area network (LAN), a wireless local area network (WLAN), a personal area network (PAN), etc.). The multimedia device 110 may receive services from and may communicate with an upstream wide area network (WAN) 140 through a connection to a provider network 150. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), Zig-Bee, etc.) may be used to deliver communications between a multimedia device 110 and client device 120.

A multimedia device 110 may output live or linear content to a client device 120 as the content is received at the multimedia device 110, or the multimedia device 110 may store content and output the stored content to a client device 120 at a later time. For example, content may be recorded and stored at the multimedia device 110, wherein the content may be conditioned or transcoded into a format that is compatible with one or more client devices 120. The multimedia device 110 may carry out a data transfer or synchronization operation with an associated client device 120, wherein linear or stored content is wirelessly transferred to the client device 120. The multimedia device 110 may output content to a client device 120 when the content is requested, when the content has been conditioned and made available for delivery, or at a scheduled time.

In embodiments, the multimedia device 110 may receive a piece of multimedia content as a stream, and the stream carrying the piece of content may be received through one of one or more tuners of the multimedia device 110. The multimedia device 110 may include a plurality of tuners, and each tuner may be tuned to a channel over which a stream carrying a piece of media content may be received. As an example, where the multimedia device 110 has more than one tuner, a user may view content from a first channel on a display device connected to the multimedia device 110 while the multimedia device 110 records content received over one or more other channels. As another example, where the multimedia device 110 has more than one tuner, the multimedia device 110 may record content from a number of channels equal to the number of tuners in the multimedia device 110. It should be understood that a tuner may be a single device used to capture information related to a channel or program, or the tuner may be a virtual tuner that uses IP (Internet protocol) or other protocols to access information related to a specific channel or program. For example, for a device attached to a hybrid fiber coaxial (HFC) network, a narrowband quadrature amplitude modulation (QAM) tuner, a wideband tuner, or a collection of narrowband tuners can be used to access a program stream within a data over cable service interface specification (DOCSIS) bonded channel. Other implementations using other broadband access networks may not use explicit tuners, but can extract the relevant channel or program information directly from an IP network.

In embodiments, when a request for a new recording session is received at a multimedia device 110 and the multimedia device 110 does not have a tuner available to carry out the recording session, the multimedia device 110 may output a notification informing a user that no tuner is available to accomplish the recording request. The notification may include an identification of a duration of time until a tuner will become available for carrying out the recording, and the user can then decide and instruct the multimedia device 110 whether or not to schedule the recording session once the tuner becomes available. The multimedia device 110 may determine a duration of time until a tuner will become available by identifying content currently being recorded or scheduled to be recorded by the tuner(s) and determining a scheduled end time for the content currently being recorded or scheduled to be recorded. For example, the scheduled end time of the content may be identified by querying program data (e.g., EPG (electronic program guide) data or other source of program information). The multimedia device 110 may use the scheduled end time that is nearest to the scheduled start time of the requested piece of content to determine the duration of time until a tuner will be available. For example, the duration of time until a tuner will be available may be the difference between the nearest scheduled end time and the scheduled start time of the piece of content associated with the recording request.

If the decision is made to schedule the recording, the multimedia device 110 may begin recording the content once the tuner becomes free, thus the recording will be missing an initial portion of the content, the initial portion being that portion that was transmitted during the period of time occurring between a scheduled start or receive time for the content (e.g., a scheduled start time according to EPG (electronic program guide) data associated with the content) and the time at which the tuner became available. In embodiments, the missing portion of the recording may be a trailing portion of the recorded piece of content. For example, the decision may be made to terminate a recording before the recording is completed, thus the recording will be a partial recording of the piece of content having a missing portion from the point at which the recording was terminated to the end of the content (e.g., the scheduled or actual end time of the piece of content).

In embodiments, the multimedia device 110 may query a guide (e.g., EPG data, VOD (video-on-demand) data, etc.) to determine a next time that the partially recorded program will be re-aired or when a copy of the recording will become available in the cloud (e.g., copy made available at VOD server or nDVR (network DVR)). The multimedia device 110 may then schedule a recording of the missing portion of the partially recorded program. Scheduling the recording of the missing portion may be accomplished by the multimedia device 110 without user intervention. Once the missing portion of the partially recorded content is fetched/recorded, the multimedia device 110 (or nDVR) may stitch the missing portion and partially recorded content together. The stitching operation may be carried out as a background operation. In some cases, the same piece of content may be scheduled for recording by multiple users (e.g., within a shared DVR or cloud DVR), and multiple recordings of the piece of content may be generated, wherein each recording includes an initial or trailing missing portion. When the missing portion is retrieved, the missing portion may be stitched to each of the partially recorded pieces of content created for each of the users.

In embodiments, the multimedia device 110 may be configured with a threshold duration for waiting on a tuner to become available. The threshold may be a default value or may be configured by a user. When a tuner is not available for accomplishing a recording request, and if the determination is made that the duration of time until a tuner becomes available is greater than the threshold duration, or if a user otherwise selects an option to forego the requested recording session, the multimedia device 110 may output a notification to a display informing the user of one or more alternate times at which the recording request may be fulfilled. For example, the multimedia device 110 may query a guide schedule (e.g., EPG data) or VOD schedule to determine one or more other times during which the content associated with the recording request may be recorded or retrieved. Through the displayed notification, the user may select an option to schedule a recording of the content at one of the alternate times that are displayed within the notification.

In embodiments, the multimedia device 110 may determine that storage available to the multimedia device 110 for storing a requested recording is insufficient to store the requested recording. In response, the multimedia device 110 may identify a recorded piece of content that will be re-aired or otherwise made available at a future time. For example, the multimedia device 110 may identify a recorded piece of content that will be made available at an earliest time relative to other pieces of content that are recorded at storage associated with the multimedia device 110. The multimedia device 110 may delete the identified recorded piece of content from storage to make room for the requested recording, and the multimedia device 110 may create a new recording of the deleted piece of content when the piece of content is next made available for recording.

Figure 2:
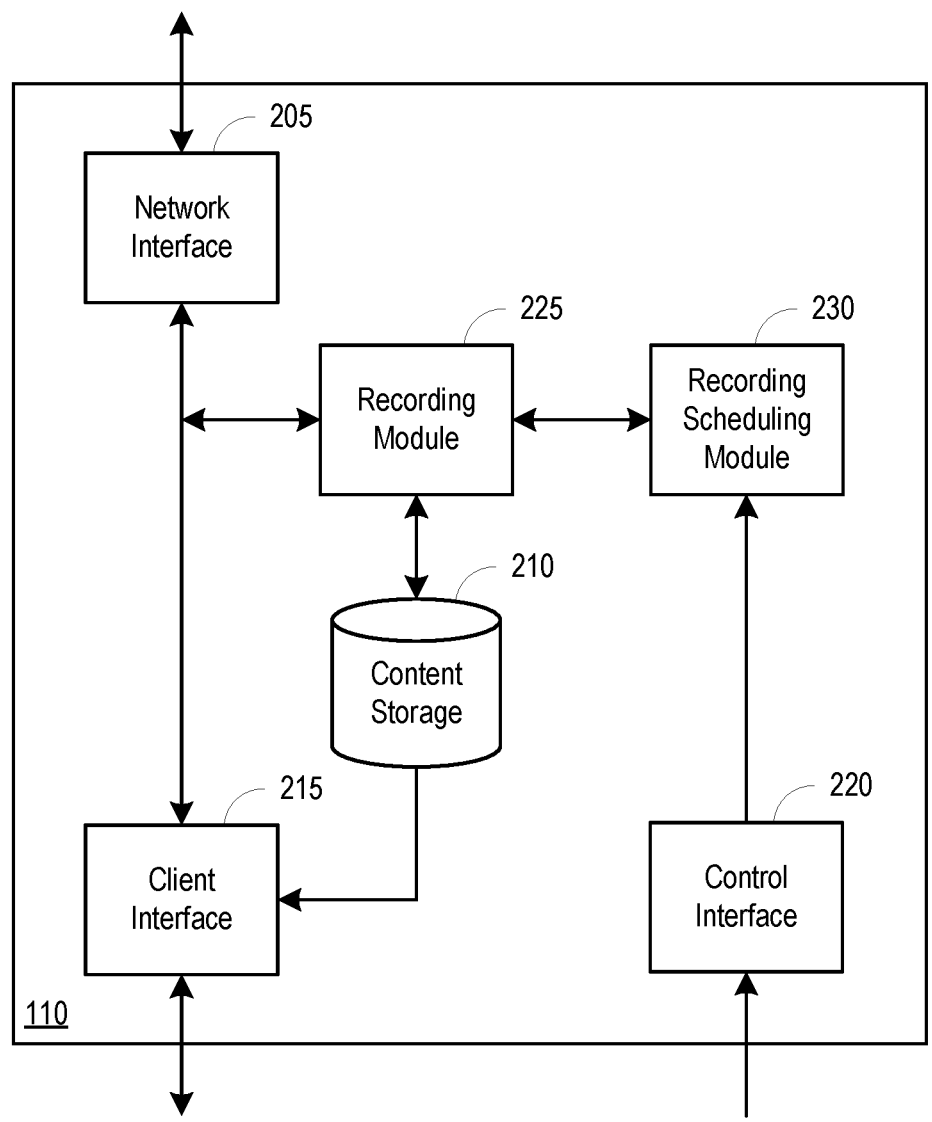
FIG. 2 is a block diagram illustrating an example multimedia device operable to facilitate the resolving of a tuner conflict at a digital video recorder.

FIG. 2 is a block diagram illustrating an example multimedia device 110 operable to facilitate the resolving of a tuner conflict at a digital video recorder. The multimedia device 110 may include a network interface 205, content storage 210, a client interface 215, a control interface 220, a recording module 225, and a recording scheduling module 230. The multimedia device 110 may include a multimedia or residential gateway, a set-top box (STB), or any other device configured to receive, store, and/or deliver multimedia content to one or more client devices 120 of FIG. 1.

In embodiments, content may be received at the multimedia device 110 from an upstream network (e.g., provider network 150 of FIG. 1, WAN 140 of FIG. 1, etc.) through the network interface 205. Communications and services received through the network interface 205 may be forwarded to one or more display or client devices (e.g., client devices 120 of FIG. 1) through the client interface 215. For example, content streams (e.g., live or linear content, VoD content, recorded content, etc.) may be recorded by the multimedia device 110 and stored at content storage 210, and/or the content streams may be forwarded to one or more client devices 120 through the client interface 215.

In embodiments, the network interface 205 may include one or more tuners. A piece of multimedia content may be received at the network interface 205 as a stream, and the stream carrying the piece of content may be received through one of the one or more tuners of the network interface 205. The network interface 205 may include a plurality of tuners, and each tuner may be tuned to a channel over which a stream carrying a piece of media content may be received. As an example, where the network interface 205 has more than one tuner, a user may view content from a first channel on a display device connected to the multimedia device 110 while the multimedia device 110 records content received over one or more other channels. As another example, where the network interface 205 has more than one tuner, the multimedia device 110 may record content from a number of channels equal to the number of tuners in the network interface 205. It should be understood that a tuner may be a single device used to capture information related to a channel or program, or the tuner may be a virtual tuner that uses IP or other protocols to access information related to a specific channel or program.

In embodiments, a content stream received through a tuner of the network interface 205 may be passed through the client interface 215 to one or more display or client devices (e.g., client devices 120 of FIG. 1). For example, a tuner may receive a content stream from a channel designated for live viewing by a user, and the content stream may be passed to a destination through the client interface 215.

In embodiments, the recording module 225 may instruct a tuner of the network interface 205 to tune to a channel designated for recording. The recording module 225 may copy and/or forward content received over the channel to content storage 210. For example, when a user designates a channel for recording or pauses a channel, the recording module 225 may forward content associated with the channel to content storage 210.

In embodiments, the multimedia device 110 may communicate with one or more client devices 120 over a wired or a wireless connection through the client interface 215. The multimedia device 110 may output content and/or other services to client devices 120 through the client interface 215 and may receive requests for content and/or other upstream communications through the client interface 215. It should be understood that the client interface 215 may include various wired and/or wireless interfaces using various protocols and/or standards (e.g., Wi-Fi, multimedia over coax alliance (MoCA), ZigBee, Ethernet, etc.) that may be used to deliver communications between the multimedia device 110 and client device(s) 120. For example, the multimedia device 110 may communicate with one or more client devices 120 over a local network 130 of FIG. 1.

In embodiments, the treatment and/or output of content (e.g., both recorded and linear content) may be controlled by user requests received from a control device (e.g., RCU) through the control interface 220. For example, a user may view available content through a menu or guide (e.g., electronic program guide (EPG), VOD content list, etc.) displayed at a display device, and may select content for delivery from the multimedia device 110 to a client device 120. The user may control playback and recording functions at the multimedia device 110 using various buttons at a control device (e.g., record, play, fast-forward, rewind, skip, and other trickplay controls).

In embodiments, when a request for a new recording session is received at a recording scheduling module 230 and the multimedia device 110 does not have a tuner available to carry out the recording session, the recording scheduling module 230 may output a notification informing a user that no tuner is available to accomplish the recording request. The notification may include an identification of a duration of time until a tuner will become available for carrying out the recording, and the user can then decide and instruct the recording scheduling module 230 whether or not to schedule the recording session once the tuner becomes available. If the decision is made to schedule the recording, the recording scheduling module 230 may instruct the recording module 225 to begin recording the content once the tuner becomes free, thus the recording will be missing an initial portion of the content, the initial portion being that portion that was transmitted during the period of time occurring between a scheduled start or receive time for the content (e.g., a scheduled start time according to EPG (electronic program guide) data associated with the content) and the time at which the tuner became available.

In embodiments, the recording scheduling module 230 may query a guide (e.g., EPG data, VOD (video-on-demand) data, etc.) to determine a next time that the partially recorded program will be re-aired or when a copy of the recording will become available in the cloud (e.g., copy made available at VOD server or nDVR (network DVR)). The recording scheduling module 230 may then schedule a recording of the missing portion of the partially recorded program. For example, the recording scheduling module 230 may instruct the recording module 225 to record the missing portion at a selected future time. Scheduling the recording of the missing portion may be accomplished by the recording scheduling module 230 without user intervention. Once the missing portion of the partially recorded content is fetched/recorded, the recording module 225 (or nDVR) may stitch the missing portion and partially recorded content together. The stitching operation may be carried out as a background operation.

In embodiments, the recording scheduling module 230 may be configured with a threshold duration for waiting on a tuner to become available. The threshold may be a default value or may be configured by a user. When a tuner is not available for accomplishing a recording request, and if the determination is made that the duration of time until a tuner becomes available is greater than the threshold duration, or if a user otherwise selects an option to forego the requested recording session, the recording scheduling module 230 may output a notification to a display informing the user of one or more alternate times at which the recording request may be fulfilled. For example, the recording scheduling module 230 may query a guide schedule (e.g., EPG data) or VOD schedule to determine one or more other times during which the content associated with the recording request may be recorded or retrieved. Through the displayed notification, the user may select an option to schedule a recording of the content at one of the alternate times that are displayed within the notification.

Figure 3:
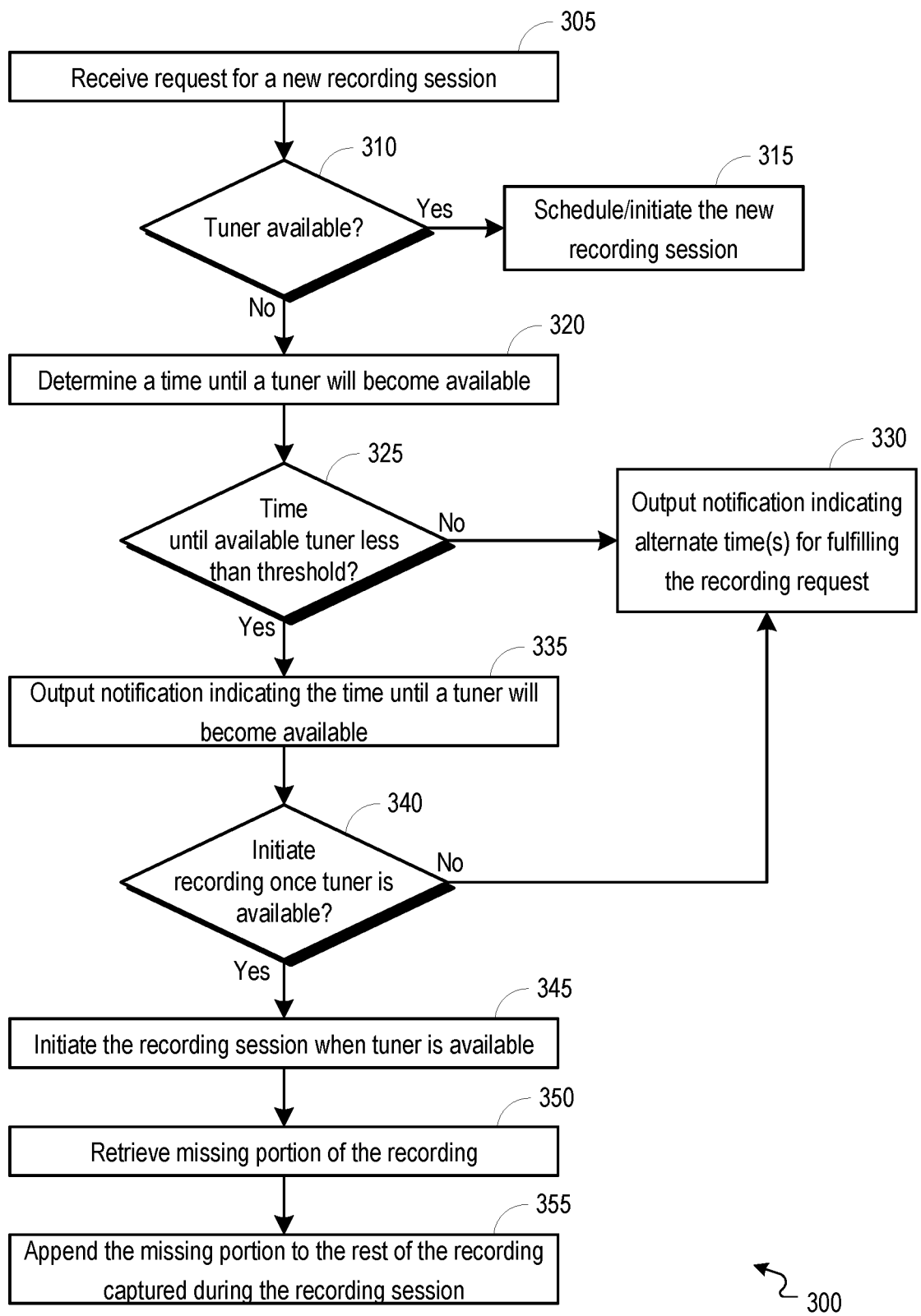
FIG. 3 is a flowchart illustrating an example process operable to facilitate the resolving of a tuner conflict at a digital video recorder.

FIG. 3 is a flowchart illustrating an example process 300 operable to facilitate the resolving of a tuner conflict at a digital video recorder. The process 300 may be carried out, for example, by a multimedia device (e.g., multimedia device 110 of FIG. 1). The process 300 may begin at 305 when a request for a new recording session is received. The request for a new recording session may be received, for example, at a multimedia device 110 (e.g., at a recording scheduling module 230 of FIG. 2). In embodiments, the request may include an identification of a program that is to be recorded, and the recording scheduling module 230 may determine a channel over which the program is to be received and a time period during which the program will be transmitted to the multimedia device 110. The recording scheduling module 230 may determine a channel over which the program is to be received and a time period during which the program will be transmitted to the multimedia device 110 based upon information retrieved from guide data (e.g., EPG data). As an example, the request may be recognized as a predetermined command (e.g., 'Record' command transmitted from a RCU (remote control unit) in response to a depressing of a 'Record' button), and the request may be made through a program guide or other user interface displayed at a client device (e.g., client device 120 of FIG. 1).

At 310, a determination may be made whether a tuner is or will be available for carrying out the new recording session. The determination whether a tuner is or will be available may be made, for example, by the multimedia device 110 (e.g., by the recording scheduling module 230). In embodiments, the recording scheduling module 230 may identify a scheduled start time at which the content associated with the new recording session is expected to be received at the multimedia device 110, and the recording scheduling module 230 may determine whether any other recordings are scheduled to overlap the scheduled start time of the new recording session and whether the multimedia device 110 has a sufficient number of tuners to carry out each of the one or more recording requests scheduling during the start time.

If, at 310, the determination is made that a tuner is or will be available for carrying out the new recording session, the process 300 may proceed to 315. At 315, the new recording session may be scheduled or initiated. As an example, the new recording session may be scheduled by the recording scheduling module 230 or initiated by a recording module 225 of FIG. 2.

If, at 310, the determination is made that a tuner is not or will not be available for carrying out the new recording session, the process 300 may proceed to 320. At 320, a duration of time until a tuner will become available may be determined. The duration of time until a tuner will become available may be determined, for example, by the multimedia device 110 (e.g., by the recording scheduling module 230). In embodiments, the recording scheduling module 230 may identify a tuner that is recording a program having a recording termination time that is nearest in time to the determined start time of the program associated with the new recording session. The recording scheduling module 230 may determine a time at which each respective program being recorded by each respective tuner will end, and the recording scheduling module 230 may calculate the difference between the nearest recording termination time of the programs currently being recorded and the start time of the program associated with the new recording session.

At 325, a determination may be made whether the determined duration of time until a tuner becomes available for carrying out the new recording session is less than a threshold duration of time. The determination may be made, for example, by the multimedia device 110 (e.g., by the recording scheduling module 230). In embodiments, the recording scheduling module 230 may compare the determined duration of time until a tuner becomes available for carrying out the new recording session to a threshold duration of time. For example, the threshold duration of time (e.g., thirty (30) seconds, one (1) minute, etc.) may be a default duration of time configured at the multimedia device 110 or may be a user-established duration of time configured at the multimedia device 110.

If, at 325, the determination is made that the determined duration of time until a tuner becomes available for carrying out the new recording session is not less than the threshold duration of time, the process 300 may proceed to 330. At 330, a notification indicating one or more alternate times for fulfilling the recording request may be output. The notification indicating one or more alternate times for fulfilling the recording request may be generated and output, for example, by the multimedia device 110 (e.g., by the recording scheduling module 230). In embodiments, the recording scheduling module 230 may query a guide schedule (e.g., EPG data) or VOD schedule to determine one or more other times during which the content associated with the recording request may be recorded or retrieved, and the recording scheduling module 230 may generate and output a notification (e.g., to a display) including an identification of the other times.

If, at 325, the determination is made that the determined duration of time until a tuner becomes available for carrying out the new recording session is less than the threshold duration, the process 300 may proceed to 335. At 335, a notification indicating the time until a tuner will become available may be output. The notification indicating the time until a tuner will become available may be generated and output, for example, by the multimedia device 110 (e.g., by the recording scheduling module 230). In embodiments, the notification may inform a user that no tuner is available to accomplish the recording request, and the notification may include an identification of a duration of time until a tuner will become available for carrying out the recording.

At 340, a determination may be made whether to initiate the requested recording session once a tuner becomes available. For example, based on the information provided within the displayed notification (e.g., the notification output at 335, a user may input a decision instructing the multimedia device 110 to either initiate the requested recording session once a tuner becomes available or to record the requested content at an alternate time. It should be understood that this step may be optional and that a multimedia device 110 may be configured to automatically initiate the recording session once a tuner becomes available, with or without user confirmation.

If, at 340, the determination is made to not initiate the requested recording session once a tuner becomes available, a notification indicating one or more alternate times for fulfilling the recording request may be output at 330.

If, at 340, the determination is made to initiate the requested recording session once a tuner becomes available, the process 300 may proceed to 345. At 345, the requested recording session may be initiated when a tuner becomes available. For example, the recording scheduling module 230 may instruct the recording module 225 of FIG. 2 to begin recording the content once the tuner becomes free, thus the recording will be missing an initial portion of the content, the initial portion being that portion that was transmitted during the period of time occurring between a scheduled start or receive time for the content (e.g., a scheduled start time according to EPG (electronic program guide) data associated with the content) and the time at which the tuner became available.

At 350, the missing portion of the recording may be retrieved. The missing portion of the recording may be identified and retrieved, for example, by the recording scheduling module 230. In embodiments, the recording scheduling module 230 may query a guide (e.g., EPG data, VOD (video-on-demand) data, etc.) to determine a next time that the content associated with the requested recording will be re-aired or when a copy of the content will become available in the cloud (e.g., copy made available at VOD server or nDVR (network DVR). The recording scheduling module 230 may then schedule a recording of the missing portion of the partially recorded program. For example, the recording scheduling module 230 may instruct the recording module 225 to record the missing portion at a selected future time.

At 355, the missing portion of the recording may be appended to the rest of the recording captured during the recording session. The missing portion may be appended to the rest of the recording, for example, by the multimedia device 110 (e.g., by the recording module 225 of FIG. 2). In embodiments, the recording module 225 may stitch the missing portion and partially recorded content together. The stitching operation may be carried out as a background operation at the multimedia device 110. It should be understood that the stitching operation may be carried out at an nDVR.

Figure 4:
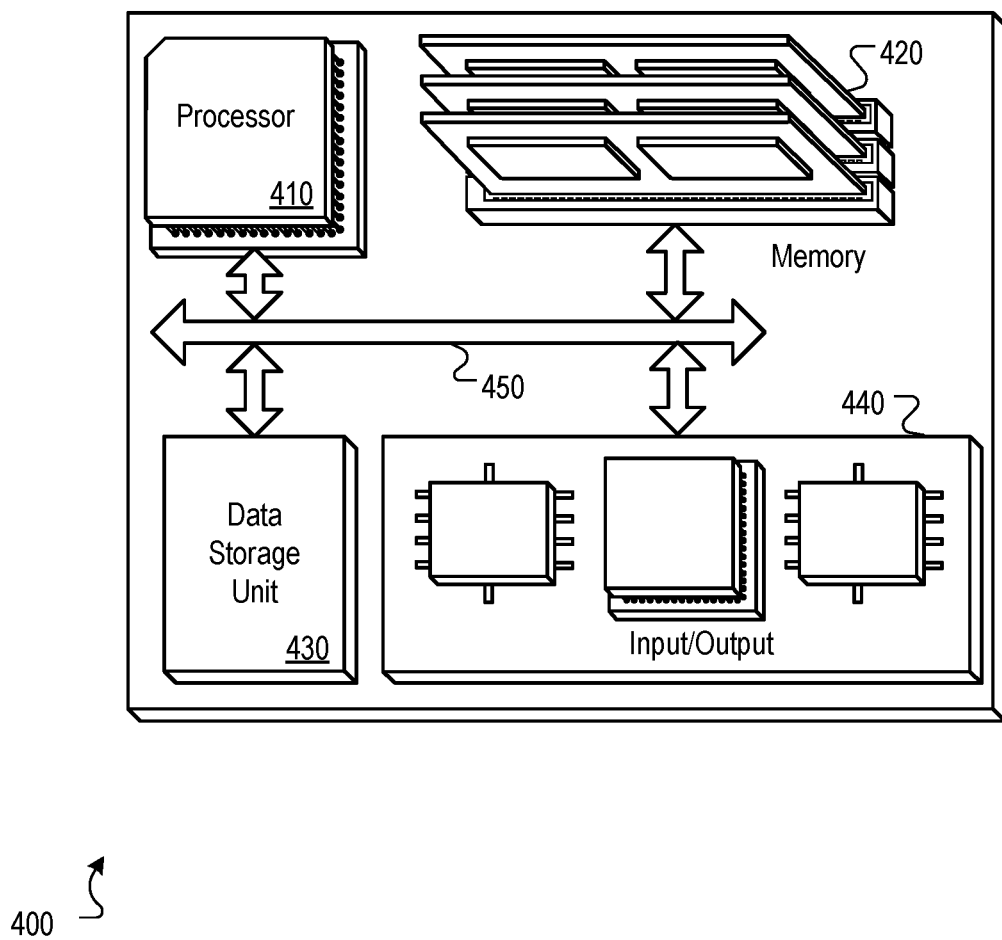
FIG. 4 is a block diagram of a hardware configuration operable to facilitate the resolving of a tuner conflict at a digital video recorder.

FIG. 4 is a block diagram of a hardware configuration 400 operable to facilitate the resolving of a tuner conflict at a digital video recorder. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein improves upon methods and systems for efficiently resolving tuner conflicts. Methods, systems, and computer readable media may be operable to facilitate the resolving of a tuner conflict at a digital video recorder. When a multimedia device receives a request for a new recording session, and there is no available tuner for carrying out the recording session, the multimedia device may determine a duration of time until a tuner becomes available. If the duration of time until a tuner becomes available is less than a threshold duration, the multimedia device may initiate the recording session once the tuner becomes available, and the missing portion of the recording may be recovered at an alternate time or from an alternate content source. When the missing portion is recovered, the recording and the missing portion may be stitched together. If the duration of time until a tuner becomes available is greater than a threshold, the multimedia device may present alternate times for recording the requested content.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:
1. A method comprising:
receiving a request for a recording of a piece of content;
determining that no tuner is available to initiate the recording at a scheduled start time of the piece of content;
determining a duration of time until a tuner will become available to initiate the recording, wherein determining the duration of time until a tuner will become available comprises:
identifying, for each respective one tuner of a plurality of tuners, a piece of content scheduled for recording by the respective one tuner;
identifying a scheduled end time for each piece of content scheduled for recording by each of the plurality of tuners;
wherein the duration of time until a tuner will become available comprises a duration of time between the scheduled start time of the piece of content for which a recording request is received and a scheduled end time of a piece of content scheduled for recording by one of the plurality of tuners that is nearest to the scheduled start time of the piece of content for which a recording request is received;
determining whether the duration of time until a tuner will become available is less than a threshold duration; and
when the determination is made that the duration of time until a tuner will become available is less than the threshold duration:
initiating a recording of a piece of content when the tuner becomes available, wherein the recording of the piece of content is missing a portion of the piece of content, the missing portion comprising a portion of the piece of content transmitted between the scheduled start time of the piece of content and the time at which the tuner became available, and storing, within shared content storage, a plurality of copies of the piece of content missing the portion of the piece of content;
determining a next availability of the piece of content, wherein the next availability includes a time at which the piece of content will be available on a network DVR, wherein the next availability of the piece of content is determined by querying guide data; and
without user intervention:
scheduling the missing portion of the piece of content to be recorded at the time at which the piece of content will be next available on a network DVR; and
appending the missing portion of the piece of content to each copy of the plurality of copies of the piece of content missing the portion of the piece of content, wherein the missing portion is appended to each copy as a background operation; and
when the determination is made that the duration of time until a tuner will become available is not less than the threshold duration:
determining one or more alternate times for recording the piece of content;
when one or more alternate times for recording the piece of content are available:
outputting a notification indicating the one or more alternate times for recording the piece of content;
receiving a user selection of an alternate time from the one or more alternate times;
scheduling a recording of the piece of content at the selected alternate time;

when one or more alternate times for recording the piece of content are unavailable:
   determining that available storage in the shared content storage is insufficient to store the scheduled recording or the copy of the piece of content;
   querying a guide, which includes video-on-demand data, to identify a recorded piece of content that is different from the scheduled recording or the copy that will be available on the network DVR and that will become available at a server at a future time; and
   deleting the identified recorded piece of content from the shared content storage to make room for the scheduled recording or the copy that will be available on the network DVR.

2. The method of claim 1, wherein determining whether the duration of time until a tuner will become available is less than a threshold duration comprises:
   outputting a notification indicating the duration of time until a tuner will become available; and
   receiving user input indicating whether the duration of time until a tuner will become available is less than a threshold duration.

3. The method of claim 1, wherein the scheduled start time of the piece of content is retrieved from electronic program guide data.

4. A multimedia device that:
   receives a request for a recording of a piece of content;
   determines that no tuner is available to initiate the recording at a scheduled start time of the piece of content;
   determines a duration of time until a tuner will become available, wherein determining the duration of time until a tuner will become available comprises:
      identifying, for each respective one tuner of a plurality of tuners, a piece of content scheduled for recording by the respective one tuner;
      identifying a scheduled end time for each piece of content scheduled for recording by each of the plurality of tuners;
      wherein the duration of time until a tuner will become available comprises a duration of time between the scheduled start time of the piece of content for which a recording request is received and a scheduled end time of a piece of content scheduled for recording by one of the plurality of tuners, the scheduled end time being the scheduled end time that is nearest to the scheduled start time of the piece of content for which a recording request is received;
   determining whether the duration of time until a tuner will become available is less than a threshold duration; and
   when the determination is made that the duration of time until a tuner will become available is less than the threshold duration:
      initiating a recording of a piece of content when the tuner becomes available, wherein the recording of the piece of content is missing a portion of the piece of content, the missing portion comprising a portion of the piece of content transmitted between the scheduled start time of the piece of content and the time at which the tuner became available, and stores, within shared content storage, a plurality of copies of the piece of content missing the portion of the piece of content;
      determining a next availability of the piece of content, wherein the next availability includes a time at which the piece of content will be available on a network DVR, wherein the next availability of the piece of content is determined by querying guide data; and
   without user intervention:
      scheduling the missing portion of the piece of content to be recorded at the time at which the piece of content will be next available on a network DVR; and
      appending the missing portion of the piece of content to each copy of the plurality of copies of the piece of content missing the portion of the piece of content, wherein the missing portion is appended to each copy as a background operation; and
   when the determination is made that the duration of time until a tuner will become available is not less than the threshold duration:
      determining one or more alternate times for recording the piece of content;
      when one or more alternate times for recording the piece of content are available:
         outputting a notification indicating the one or more alternate times for recording the piece of content;
         receiving a user selection of an alternate time from the one or more alternate times;
         scheduling a recording of the piece of content at the selected alternate time;
      when one or more alternate times for recording the piece of content are unavailable:
         determining that available storage in the shared content storage is insufficient to store the scheduled recording or the copy of the piece of content;
         querying a guide, which includes video-on-demand data, to identify a recorded piece of content that is different from the scheduled recording or the copy that will be available on the network DVR and that will become available at a server at a future time; and
         deleting the identified recorded piece of content from the shared content storage to make room for the scheduled recording or the copy that will be available on the network DVR.

5. The multimedia device of claim 4, wherein determining whether the duration of time until a tune will become available is less than a threshold duration comprises:
   outputting a notification indicating the duration of time until a tuner will become available; and
   receiving user input indicating whether the duration of time until a tuner will become available is less than a threshold duration.

6. One or more non-transitory computer readable media having instructions operable to cause one or more processors to perform the operations comprising:
   receiving a request for a recording of a piece of content;
   determining that no tuner is available to initiate the recording at a scheduled start time of the piece of content;
   determining a duration of time until a tuner will become available, wherein determining the duration of time until a tuner will become available comprises:
      identifying, for each respective one tuner of a plurality of tuners, a piece of content scheduled for recording by the respective one tuner;
      identifying a scheduled end time for each piece of content scheduled for recording by each of the plurality of tuners;
      wherein the duration of time until a tuner will become available comprises a duration of time between the scheduled start time of the piece of content for which a recording request is received and a scheduled end time of a piece of content scheduled for recoding by one of the plurality of tuners, the scheduled end time being the scheduled end time that is nearest to the scheduled start time of the piece of content for which a recording request is received;

determining whether the duration of time until a tuner will become available is less than a threshold duration; and when the determination is made that the duration of time until a tuner will become available is less than the threshold duration:

initiating a recording of the piece of content when the tuner becomes available, wherein the recording of the piece of content is missing a portion of the piece of content, the missing portion comprising a portion of the piece of content transmitted between the scheduled start time of the piece of content and the time at which the tuner became available, and storing, within shared content storage, a plurality of copies of the piece of content missing the portion of the piece of content;

determining a next availability of the piece of content, wherein the next availability includes a time at which the piece of content will be available on a network DVR, wherein the next availability of the piece of content is determined by querying guide data; and without user intervention:

scheduling the missing portion of the piece of content to be recorded at the time at which the piece of content will be next available on a network DVR; and appending the missing portion of the piece of content to each copy of the plurality of copies of the piece of content missing the portion of the piece of content, wherein the missing portion is appended to each copy as a background operation; and when the determination is made that the duration of time until a tuner will become available is not less than the threshold duration: determining one or more alternate times for recording the piece of content; when one or more alternate times for recording the piece of content are available: outputting a notification indicating the one or more alternate times for recording the piece of content; receiving a user selection of an alternate time from the one or more alternate times; scheduling a recording of the piece of content at the selected alternate time; when one or more alternate times for recording the piece of content are unavailable: determining that available storage in the shared content storage is insufficient to store the scheduled recording or the copy of the piece of content; querying a guide, which includes video-on-demand data, to identify a recorded piece of content that is different from the scheduled recording or the copy that will be available on the network DVR and that will become available at a server at a future time; and deleting the identified recorded piece of content from the shared content storage to make room for the scheduled recording or the copy that will be available on the network DVR.

7. The one or more non-transitory computer-readable media of claim 6, wherein determining whether the duration of time until a tuner will become available is less than a threshold duration comprises:

outputting a notification indicating the duration of time until a tuner will become available; and receiving user input indicating whether the duration of time until a tuner will become available is less than a threshold duration.

8. The one or more non-transitory computer-readable media of claim 6, wherein the scheduled start time of the piece of content is retrieved from electronic program guide data.

\* \* \* \* \*